(12) United States Patent
Halsema

(10) Patent No.: US 8,430,491 B2
(45) Date of Patent: Apr. 30, 2013

(54) PRINTER APPARATUS WITH INK INCORPORATING STRUCTURAL COLOR

(75) Inventor: Aillil Ian Halsema, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 186 days.

(21) Appl. No.: 13/027,555

(22) Filed: Feb. 15, 2011

(65) Prior Publication Data

US 2012/0206548 A1 Aug. 16, 2012

(51) Int. Cl.
 *B41J 2/17* (2006.01)
(52) U.S. Cl.
 USPC .............. 347/95; 347/100; 977/773; 524/577
(58) Field of Classification Search .................... 347/95, 347/100; 430/108.1; 977/773; 524/577
 See application file for complete search history.

(56) References Cited

U.S. PATENT DOCUMENTS

| 6,866,375 | B2 | 3/2005 | Leighton et al. | |
| 7,568,795 | B2 | 8/2009 | Freitag et al. | |
| 7,892,872 | B2 * | 2/2011 | Hieslmair et al. | 438/45 |
| 2005/0027176 | A1 * | 2/2005 | Xie | 600/316 |
| 2008/0029766 | A1 * | 2/2008 | Onodera et al. | 257/71 |
| 2010/0230517 | A1 * | 9/2010 | Yadav et al. | 241/23 |
| 2011/0266549 | A1 * | 11/2011 | Onodera et al. | 257/71 |

OTHER PUBLICATIONS

Pursiainen, Otto L. et al., "Nanoparticle-tuned structural color from polymer opals," Optics Express 9553, Jul. 23, 2007, vol. 15, No. 15, 9 Pages.
Konoshita, Shuichi et al., "Photophysics of Structural Color in the Morpho Butterflies," Forma, 2002, 17, pp. 103-121.

* cited by examiner

*Primary Examiner* — Ellen Kim
(74) *Attorney, Agent, or Firm* — MH2 Technology Law Group LLP

(57) ABSTRACT

A method of dynamically controlling a perceived ink color printed on a substrate can include mixing selected amounts of each of a polystyrene nano-sphere dopant component and a nano-particle dopant component with a clear fluid carrier component, the mixed components configured in real time to define an ink structure having a predetermined wavelength. The method can further include imaging the substrate by ejecting the mixed components onto the substrate, the perceived color of the imaged substrate corresponding to a reflected wavelength of the ink structure. In embodiments, each of the carrier and dopant components can be in a powder form suitable for fuser type imaging devices.

15 Claims, 4 Drawing Sheets

PRINTER APPARATUS WITH INK INCORPORATING STRUCTURAL COLOR

FIELD OF THE INVENTION

This invention relates generally to imaging and, more particularly, to dynamically producing ink having structural color, in real-time in a printer.

BACKGROUND OF THE INVENTION

Previously, colored ink was produced by adding pigments which reflected or absorbed colors, and process colors were produced by mixing the various pigmented inks on the print medium. These pigments are usually cyan, magenta, yellow, and black (CMYK color model). Use of these colors provides a relatively small color gamut, and is not sufficient to reproduce all colors. To expand the reproducible color gamut, additional colored inks are used, such as Pantone's six-color (CMYKOG) Hexachrome process, adding to the printer's cost and complexity.

The concept of structural color has been addressed in the formation of synthetic opals. In that process, certain submicron (250-350 nm) polystyrene spheres and nano-particles of less than about 50 nm in diameter are mixed into a viscous melted carrier fluid that hardens into a flexible sheet as it cools. However, structural color has not previously been addressed in the environment of producing ink using structural color, particularly in real time in a printer.

This innovation expands the range of hues reproducible by printers beyond those obtained with conventional inks. Further, this innovation reduces the complexity of color printers by eliminating the need for spot-color inks or six-color processes to expand the printer's reproducible gamut of colors.

SUMMARY OF THE INVENTION

According to various embodiments, the present teachings include a method of dynamically controlling a perceived ink color printed on a substrate by an ink jet printer. The method can include mixing selected amounts of each of a polystyrene nano-sphere dopant component and a nano-particle dopant component with a clear fluid carrier component, the mixed components configured in real time to define an ink structure having a predetermined wavelength; and imaging the substrate by ejecting the mixed components onto the substrate, the perceived color of the imaged substrate corresponding to a reflected wavelength of the ink structure.

According to various embodiments, the present teachings can include a method of dynamically controlling a perceived ink color printed on a substrate. The method can include mixing selected amounts of each of a powdered polystyrene nano-sphere dopant component and a powdered nano-particle dopant component with a powdered carrier component; dispensing the mixed components onto the substrate, the dispensed components configured to correspond to a predetermined structural color; and fusing the image, the fused image exhibiting the structural ink color of the dispensed mixed components.

According to various embodiments, the present teachings can include an ink for use in an ink jet printer. The ink can include a polystyrene nano-sphere dopant; a nano-particle dopant; and a carrier fluid configured to support each of the dopants in suspension therein.

According to various embodiments, the present teachings can include an ink toner mixture. The ink toner mixture can include a powdered polystyrene nano-sphere dopant; a powdered nano-particle dopant; and a powdered carrier, each of the dopants pre-mixed into the powdered carrier.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It will be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

It should be noted that some details of the figures have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

As used herein, the term "imaging" refers to any of conventional imaging such as ink jet, xerography, electrophotography, as known in the art.

The development herein is an application of light interference produced by the nano-structure of the ink. By controlling the ink's structure, the wavelength of the interference-producing structure can be controlled, thereby controlling the perceived color of the ink.

Figure 1:
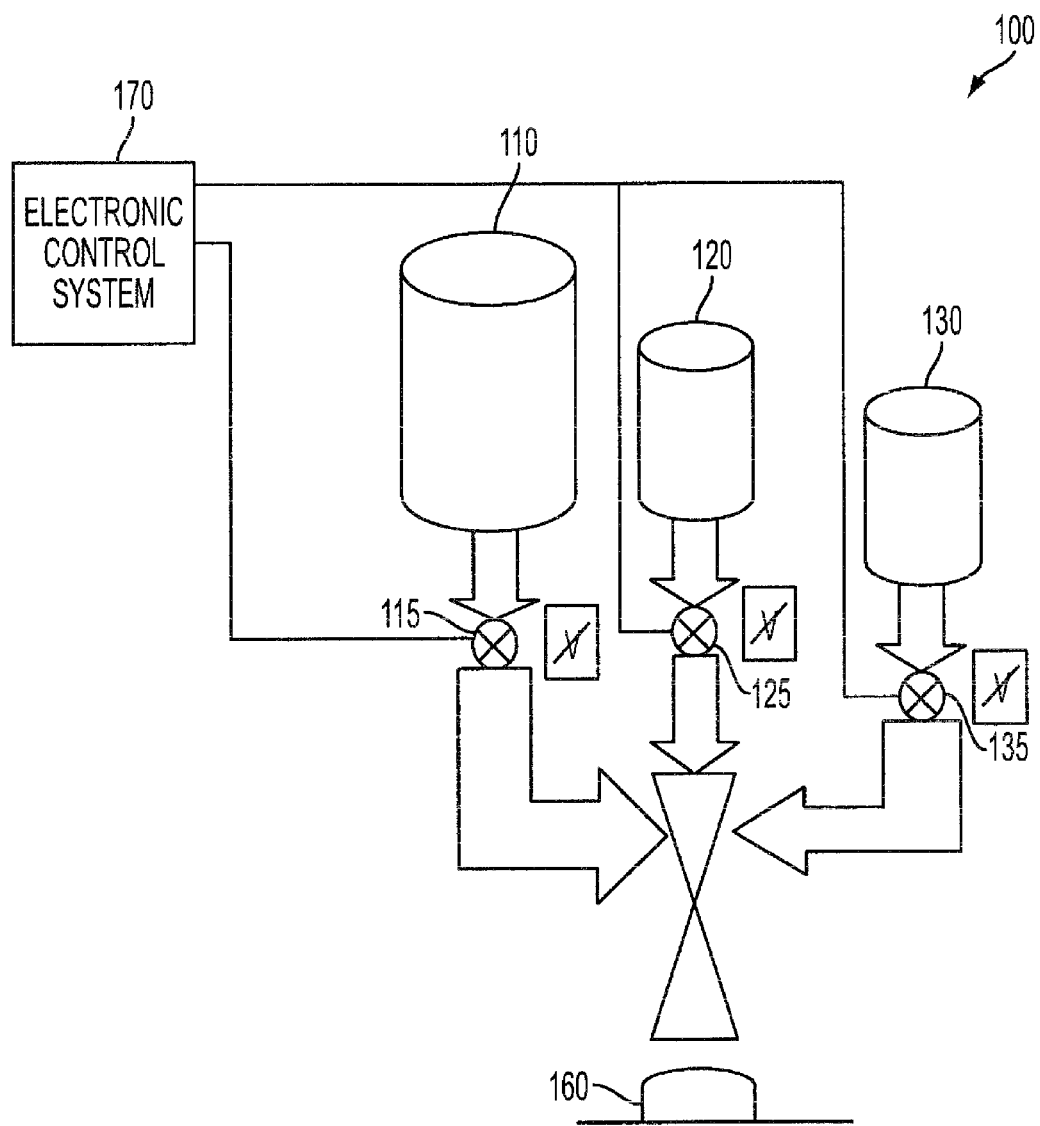
FIG. 1 is a schematic view of an ink supply apparatus in accordance with the present teachings.

FIG. 1 depicts an exemplary ink supply apparatus 100 in accordance with the present teachings. It should be readily apparent to one of ordinary skill in the art that the ink supply apparatus 100 depicted in FIG. 1 represents a generalized schematic illustration and that other components can be added or existing components can be removed or modified.

As shown in FIG. 1, the ink supply apparatus 100 can include supply reservoirs 110, 120, 130, a mixing device 140, a substrate such as a print medium 150 for receiving ink in the form of an image 160 from the mixing device 140, and an electronic control system 170 for controlling operation of the ink supply apparatus 100.

In various embodiments, the reservoirs 110, 120, 130 can refer to a carrier reservoir (110), and two or more dopant reservoirs (120, 130), respectively. Each of the reservoirs 110, 120, 130, can include a corresponding valve 115, 125, 135 through which the component of the respective reservoir is dispensed into the mixing device 140.

The carrier reservoir 110 can be a heated reservoir and supply a clear carrier or varnish. In certain embodiments, the carrier reservoir 110 can supply carrier particles for supply of an ink powder or the like to the substrate 150. One of the dopant reservoirs, e.g. dopant reservoir 120, can supply a polystyrene nano-sphere dopant. In certain embodiments, the polystyrene nano-sphere dopant can be supplied as a fluid. In certain embodiments, the polystyrene nano-sphere dopant can be supplied as a particulate. In either instance, the polystyrene nano-sphere dopant can be of a particle size and supplied in an amount sufficient to cooperate with the supplied components from carrier reservoir 110 and dopant reservoir 130 to control the structure of the ink and therefore the perceived color of the ink (e.g. image 160) dispensed onto the substrate 150.

One of the dopant reservoirs, e.g. dopant reservoir 130, can supply a nano-particle dopant. In certain embodiments, the nano-particle dopant can be supplied as a fluid. In certain embodiments, the nano-particle dopant can be supplied as a particulate. In either instance, the nano-particle dopant can be of a particle size and supplied in an amount sufficient to cooperate with the supplied components from carrier reservoir 110 and dopant reservoir 120 to control the structure of the ink and therefore the perceived color of the ink (e.g. in image 160).

In operation, the electronic control system 170 can release the carrier from the reservoir 110 and the dopants from reservoirs 120 and 130 by selectively operating the valves 115, 125, 135. The components dispensed from the reservoirs can be directed to the mixing device 140 and mixed for a time sufficient to disperse the components into a mixture suitable for application to the substrate 150. The electronic control system 170 can instruct application of the mixture to the substrate 150, where the mixture can cool and harden into a flexible colored film 160. The color of the film 160 can be continuously controlled by varying the opening of the dopant valves 125 and 135.

In addition to controlling the amount of dopants released into the mixing device 140, a size of the dopant nano-spheres and nano-particles can be controlled to determine a resultant structural color of the film 160 on the substrate 150. In certain embodiments, the nano-particle dopant can be selected from, for example, carbon, titanium dioxide, or colloidal gold.

If the ink is supplied to the substrate 150 as a liquid, for example from an ink jet type printer, then the ink applied to the substrate 150 can dry as known in those devices. If the ink is supplied to the substrate 150 as an ink toner powder, then heat and pressure can be used to fuse the image to the substrate 150 as known in the art. Exemplary systems for ink jet printing and fusing of images are depicted in FIGS. 2 and 3, respectively as follows.

Figure 2:
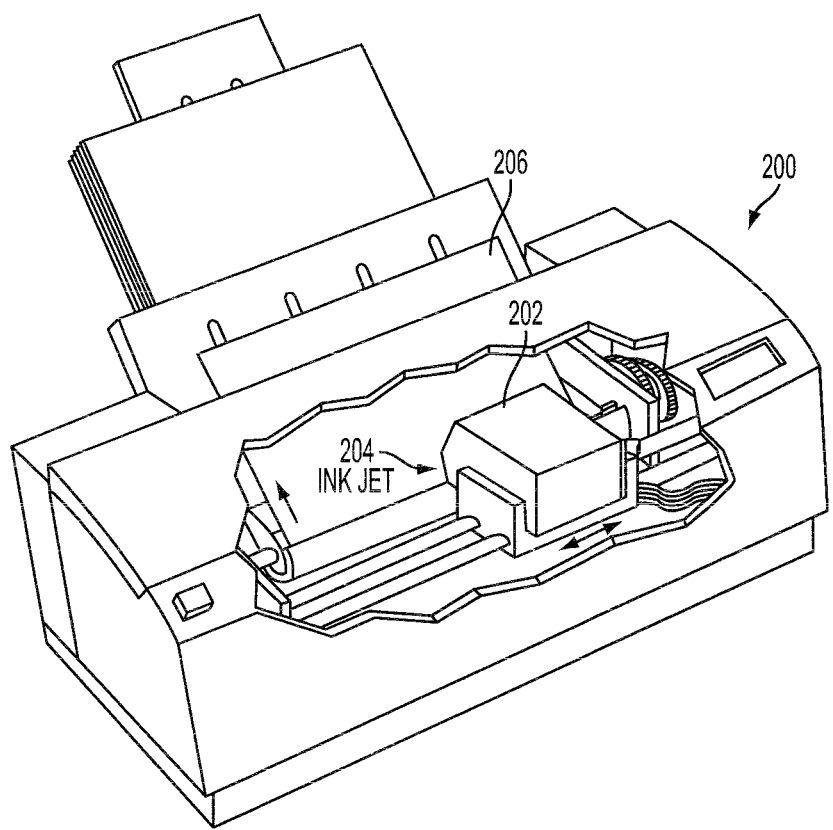
FIG. 2 is a perspective view of an ink jet type printer, for use with the ink supply apparatus of FIG. 1, in accordance with the present teachings.
Figure 3:
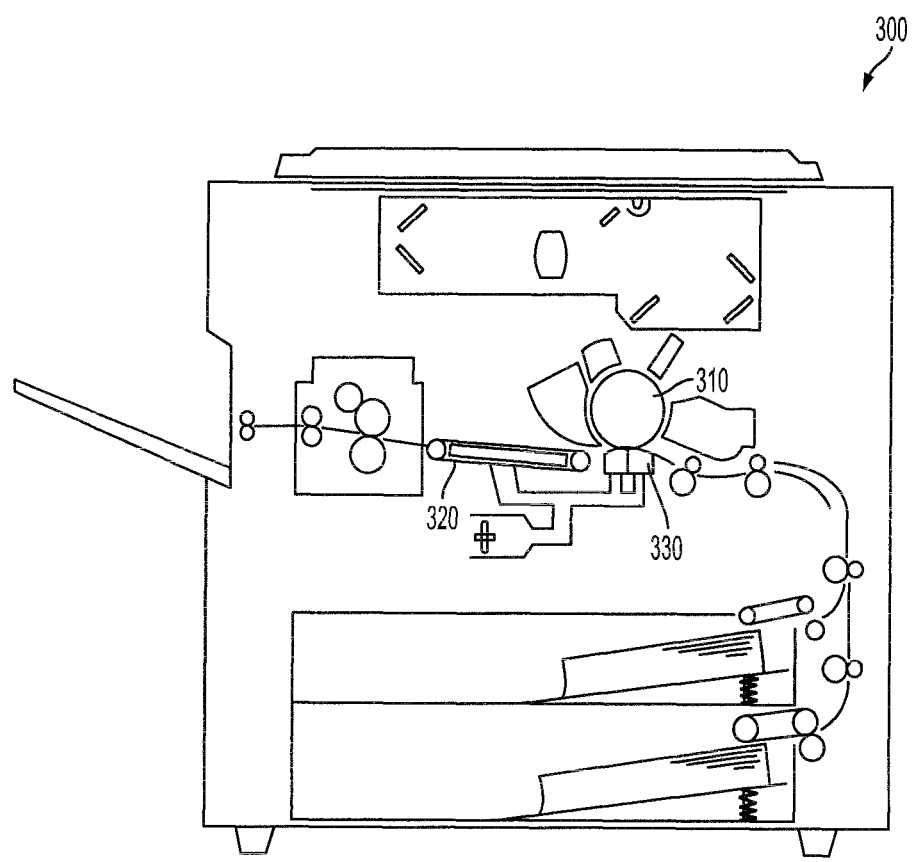
FIG. 3 is a perspective view of an electrophotographic imaging device, for use with the ink supply apparatus of FIG. 1, in accordance with the present teachings.

FIG. 2 is a schematic view depicting an exemplary imaging device 200 for incorporation of the ink supply apparatus 100, in accordance with the present teachings. It should be readily apparent to one of ordinary skill in the art that the depiction in FIG. 2 represents a generalized schematic illustration and that other components can be added or existing components can be removed or modified.

As shown in FIG. 2, the imaging device 200 can include a print head 202 housing at least a portion of the ink supply apparatus 100 of FIG. 1, in accordance with the invention. The ink supply apparatus of the print heat 202 is operated in accordance with digital instructions to create a desired image 204 on a print medium 206 moving past the printhead 202. The print head 202 can move back and forth relative to the sheet in a scanning motion to generate the printed image swath by swath. Alternately, the print head 202 can be held fixed and the media 206 moved relative to it, creating an image as wide as the print head 202 in a single pass.

It will be appreciated that FIG. 2 is an exemplary ink jet print head only, and that the ink supply apparatus 100 of FIG. 1 can be implemented in any similar liquid ink type device known in the art.

FIG. 3 is a schematic view depicting an exemplary electrophotographic imaging device 300 for incorporation of the ink supply apparatus 100, in accordance with the present teachings. It should be readily apparent to one of ordinary skill in the art that the depiction in FIG. 3 represents a generalized schematic illustration and that other components can be added or existing components can be removed or modified.

As shown in FIG. 3, electrophotographic imaging device 300 can include a photoreceptor drum 310, a sheet carriage 320 for receiving a sheet from the photoreceptor drum 310 to carry the same, and a transcription/separation charger 330 for generating a corona discharge on the photoreceptor drum 41 for charging thereof.

It will be appreciated that FIG. 3 is intended to represent an exemplary electrophotographic imaging device only, and can encompass any printer in which the required image is written by a beam of light onto a photoconductive drum or band that has a uniform electric charge over its surface. The action of the light beam produces a charge pattern on the photoconductor, which is then developed by applying particles of pigment that are attracted to the image but are repelled by the background. The image is then transferred to paper by pressing the paper against the drum or band and applying an electric field. The toner is fixed to the paper by heat and/or pressure.

Figure 4A:
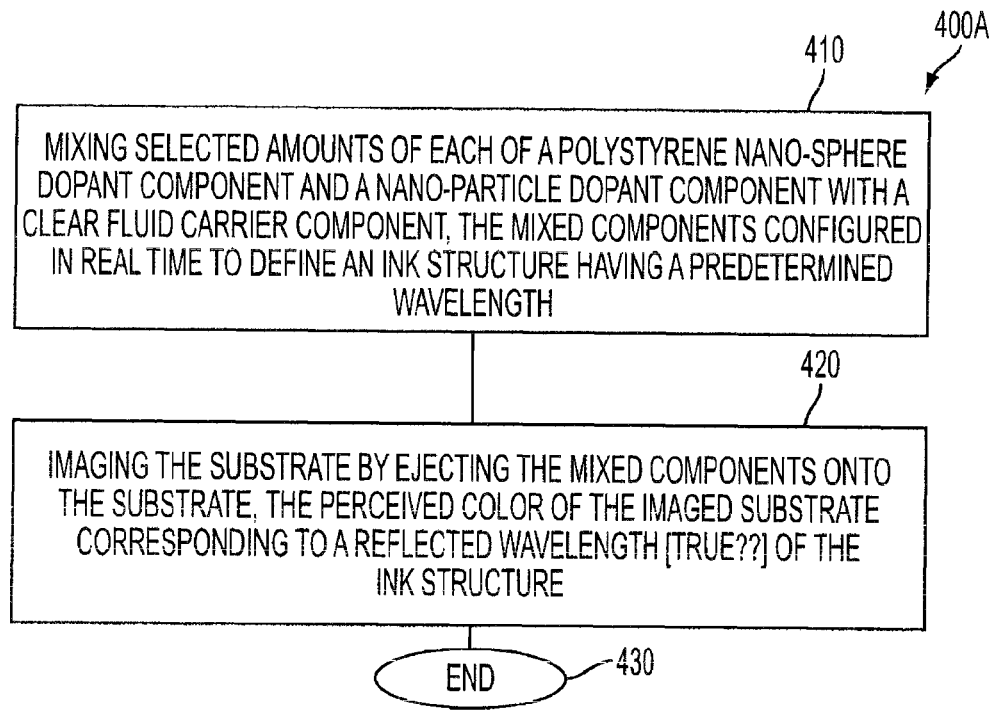
FIGS. 4A and 4B depict methods of dynamically controlling a perceived ink color printed on a substrate, in accordance with the present teachings.

FIG. 4A depicts a method 400A in accordance with the present teachings. It should be readily apparent to one of ordinary skill in the art that the method 400A depicted in FIG. 4A represents a generalized schematic illustration and that other steps can be added or existing steps can be removed or modified.

The method 400A relates to a method of dynamically controlling a perceived ink color printed on a substrate by, for example, an ink jet printer.

At 410, the method can include mixing selected amounts of each of a polystyrene nano-sphere dopant component and a nano-particle dopant component with a clear fluid carrier component, the mixed components configured in real time to define an ink structure having a predetermined wavelength.

At 420, the method can include imaging the substrate by ejecting the mixed components onto the substrate, the perceived color of the imaged substrate corresponding to a reflected wavelength of the ink structure.

At 430, the method can end, but can return to certain points and repeat.

Figure 4B:
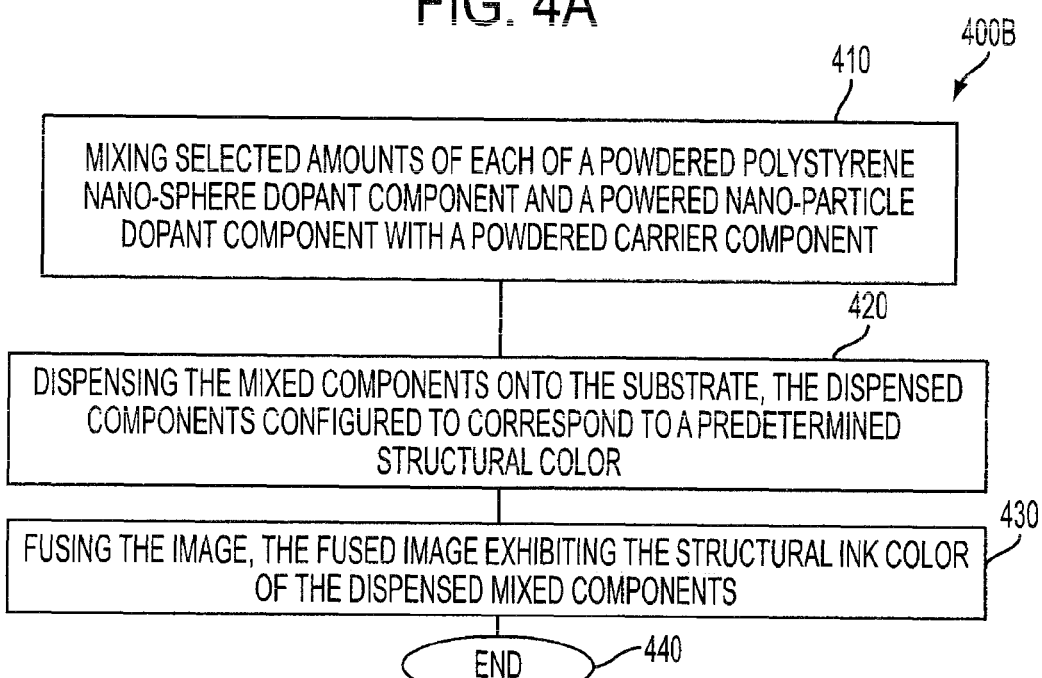

FIG. 4B depicts a method 400B in accordance with the present teachings. It should be readily apparent to one of ordinary skill in the art that the method 400B depicted in FIG.

4B represents a generalized schematic illustration and that other steps can be added or existing steps can be removed or modified.

The method 400B relates to a method of dynamically controlling a perceived ink color printed on a substrate.

At 410, the method can include mixing selected amounts of each of a powered polystyrene nano-sphere dopant component and a powdered nano-particle dopant component with a powdered carrier component.

At 420, the method can include dispensing the mixed components onto the substrate, the dispensed components configured to correspond to a predetermined structural color.

At 430, the method can include fusing the image, the fused image exhibiting the structural ink color of the dispensed mixed components.

At 440, the method can end, but can return to certain points and repeat.

It will be appreciated that advantages exist over prior known ink printing devices. The structural color of the ink herein can enable reduced-cost color printers with a wide array of structural color ink. The design incorporates fewer parts and improves color rendition. In addition, the apparatus herein can produce iridescent color effects.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of dynamically controlling a perceived ink color printed on a substrate by an ink jet printer, the method comprising:

mixing selected amounts of each of a polystyrene nano-sphere dopant component and a nano-particle dopant component with a clear fluid carrier component, the mixed components configured in real time to define an ink structure having a predetermined wavelength; and imaging the substrate by ejecting the mixed components onto the substrate, the perceived color of the imaged substrate corresponding to a reflected wavelength of the ink structure.

2. The method of claim 1, wherein particle size of the nano-particle dopant component determines the perceived ink color.

3. The method of claim 1, wherein an amount of the nano-particle dopant material determines the perceived ink color.

4. The method of claim 1, wherein a composition of the nano-particle dopant material determines the perceived ink color.

5. The method of claim 4, wherein the nano-particle dopant material is selected from one or more of carbon, titanium dioxide, and colloidal gold.

6. The method of claim 1, wherein both particle size and amount of the nano-particle dopant material determines the perceived ink color.

7. The method of claim 1, wherein the size of the nano-sphere dopant determines the perceived ink color.

8. The method of claim 1, wherein an amount of the nano-sphere dopant determines the perceived ink color.

9. The method of claim 1, wherein both nano-sphere size and amount of the nano-sphere dopant determine the perceived ink color.

10. The method of claim 1, wherein each of the polystyrene nano-sphere dopant component, nano-particle dopant component, and carrier component are separately provided to a mixer.

11. The method of claim 1, wherein the clear carrier comprises a clear viscous varnish.

12. The method of claim 1, further comprising dispensing the clear carrier fluid from a heated reservoir.

13. The method of claim 1, further comprising cooling and hardening the pre-mixed components ejected onto the substrate into a flexible film.

14. The method of claim 1, further comprising an electronic control system for selectively dispensing each of the dopant components and carrier fluid component from respective reservoirs into a mixer in amounts configured to define a perceived color on the substrate.

15. An ink for use in an ink jet printer, the ink comprising:
a polystyrene nano-sphere dopant;
a nano-particle dopant; and
a carrier fluid configured to support each of the dopants therein.

* * * * *